(12) United States Patent
Morrison et al.

(10) Patent No.: US 10,252,801 B2
(45) Date of Patent: Apr. 9, 2019

(54) ELECTROMAGNETIC SURVEY SYSTEM HAVING TOW ASSEMBLY WITH ATTITUDE ADJUSTMENT

(71) Applicant: GEOTECH LTD., Aurora (CA)

(72) Inventors: Edward Beverly Morrison, Aurora (CA); Ryan Raz, Aurora (CA)

(73) Assignee: GEOTECH LTD. (CA)

( * ) Notice: Subject to any disclaimer, the term of this patent is extended or adjusted under 35 U.S.C. 154(b) by 26 days.

(21) Appl. No.: 15/553,648

(22) PCT Filed: Feb. 26, 2016

(86) PCT No.: PCT/CA2016/050206
§ 371 (c)(1),
(2) Date: Aug. 25, 2017

(87) PCT Pub. No.: WO2016/134483
PCT Pub. Date: Sep. 1, 2016

(65) Prior Publication Data
US 2018/0044019 A1    Feb. 15, 2018

Related U.S. Application Data

(60) Provisional application No. 62/133,150, filed on Mar. 13, 2015, provisional application No. 62/126,435, filed on Feb. 27, 2015.

(51) Int. Cl.
*G01V 3/16* (2006.01)
*B64D 1/22* (2006.01)
*G01V 3/165* (2006.01)

(52) U.S. Cl.
CPC ............... *B64D 1/22* (2013.01); *G01V 3/16* (2013.01); *G01V 3/165* (2013.01)

(58) Field of Classification Search
CPC ............. B64D 1/22; G01V 3/165; A63J 1/02
See application file for complete search history.

(56) References Cited

U.S. PATENT DOCUMENTS 4,138,077 A * 2/1979 Okumura ............. A62B 1/00
244/137.2
4,628,266 A 12/1986 Dzwinel
(Continued)

FOREIGN PATENT DOCUMENTS

DE   4336181 A1   4/1995
WO   2008071006 A1   6/2008
(Continued)

OTHER PUBLICATIONS

International Search Report and Written Opinion; PCT Application No. PCT/CA2016/050206; dated May 17, 2016.
(Continued)

*Primary Examiner* — Jermele M Hollington
*Assistant Examiner* — Alvaro Fortich
(74) *Attorney, Agent, or Firm* — Polsinelli PC

(57) ABSTRACT

A tow assembly for airborne geophysical surveying that comprises a frame incorporating geophysical surveying equipment; and a suspension assembly for suspending the frame from an aircraft. The suspension assembly has a plurality of suspension ropes connected to the frame at spaced apart connection points for suspending the frame from an aircraft. Lengths of the suspension ropes are adjustable with respect to at least four of the connection points to adjust an attitude of the frame during flight.

20 Claims, 10 Drawing Sheets

(56) References Cited

U.S. PATENT DOCUMENTS

| | | |
|---|---|---|
| 8,493,068 B2 | 7/2013 | Morrison et al. |
| 2009/0212778 A1* | 8/2009 | Kuzmin ................ G01V 3/165 324/330 |
| 2011/0001480 A1 | 1/2011 | Kuzmin et al. |
| 2011/0050230 A1 | 3/2011 | Kuzmin et al. |
| 2011/0148421 A1 | 6/2011 | Kuzmin et al. |
| 2015/0015263 A1* | 1/2015 | Miles .................... G01V 3/165 324/331 |

FOREIGN PATENT DOCUMENTS

| | | |
|---|---|---|
| WO | 2010071991 A1 | 7/2010 |
| WO | 2015000021 A1 | 1/2015 |

OTHER PUBLICATIONS

English abstract of DE4336181; retrieved from www.epacenet.com on Mar. 29, 2018.
Examination Report; Denmark Application No. PA 2017 70569; dated Dec. 14, 2017.

* cited by examiner

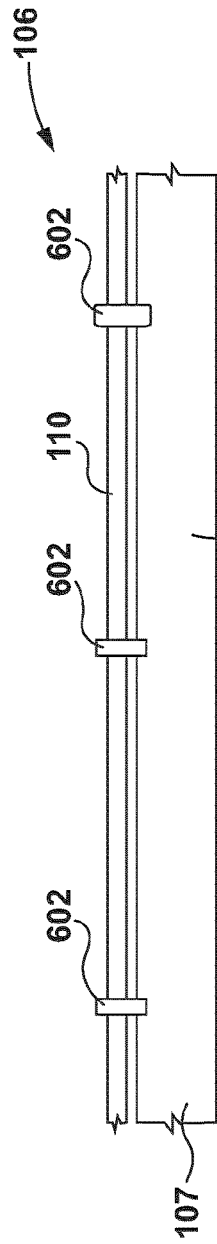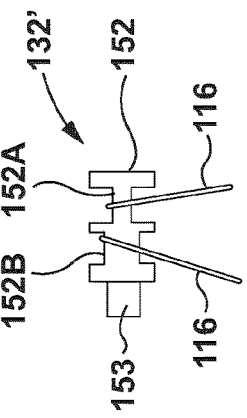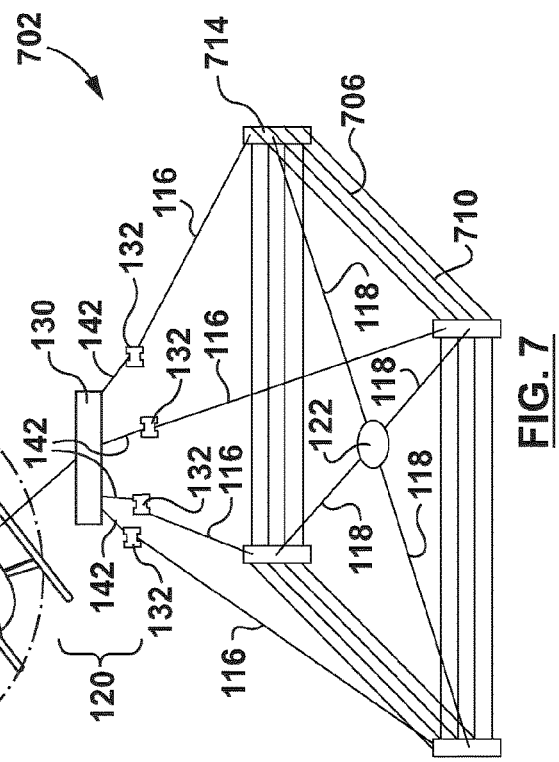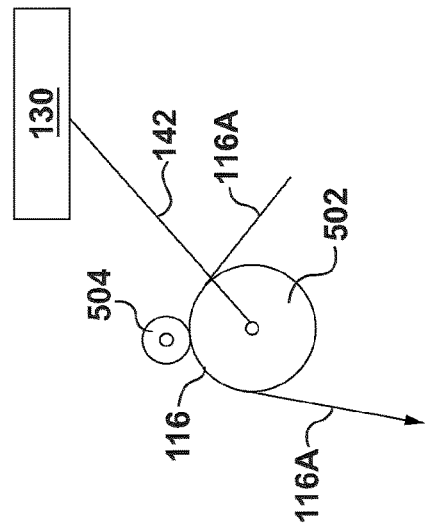

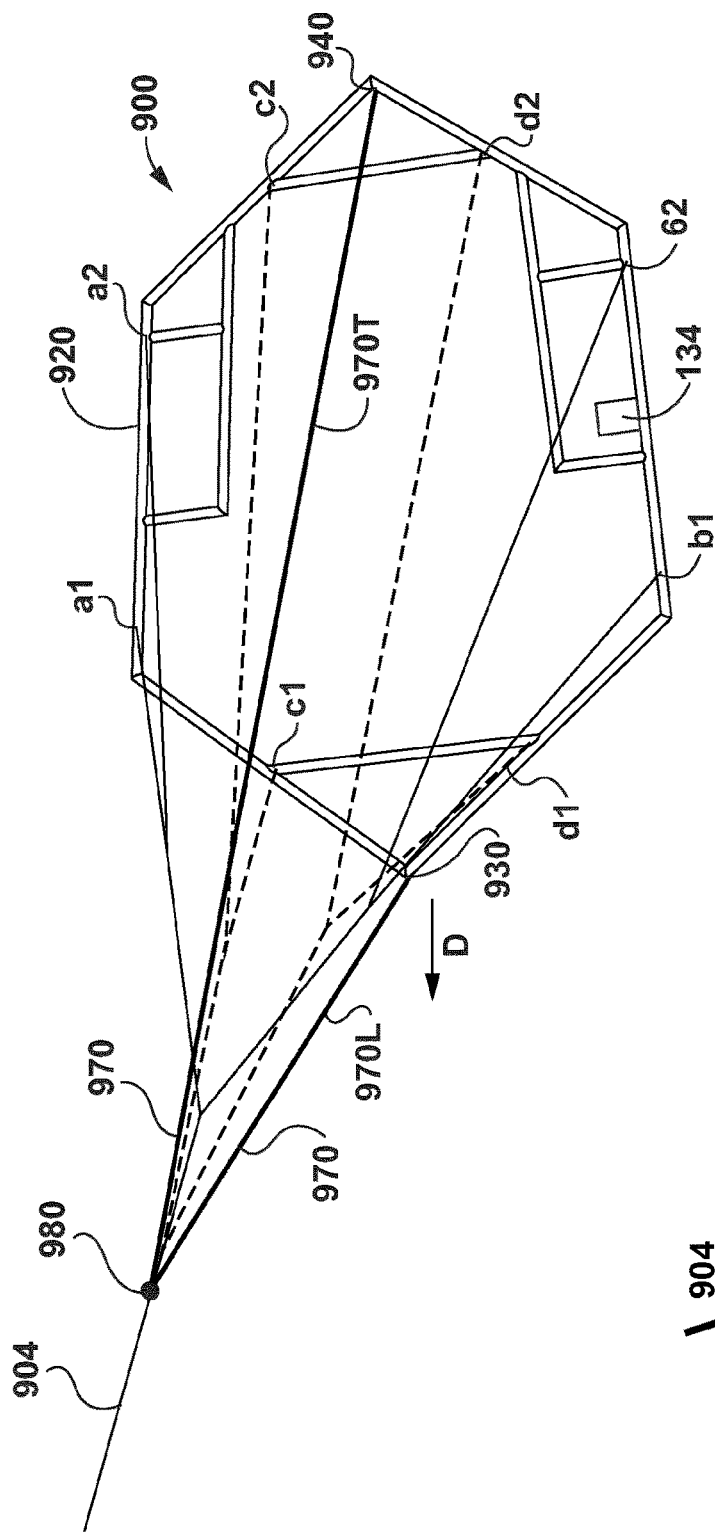
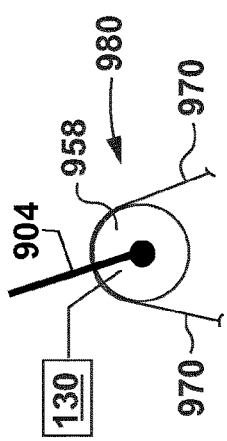
FIG. 13
FIG. 14

ELECTROMAGNETIC SURVEY SYSTEM HAVING TOW ASSEMBLY WITH ATTITUDE ADJUSTMENT

This application is a national stage entry of PCT/CA2016/050206 filed Feb. 26, 2016, which claims priority to and the benefit of U.S. Provisional Patent Application No. 62/126,435 filed Feb. 27, 2015 and U.S. Provisional Patent Application No. 62/133,150 filed Mar. 13, 2015, the contents of each of the applications, in their entirety, are incorporated herein by reference.

BACKGROUND

Embodiments described herein relate to the field of airborne electromagnetic surveying.

Electromagnetic ("EM") sensing equipment is routinely used to perform EM surveying for geophysical mapping purposes. Two types of EM surveying include passive source EM surveying and active source EM surveying. In passive source EM surveying, a magnetic receiver is used to measure a magnetic response of the earth ("earth response") to naturally occurring sources of stimuli such as lightening strikes. In active source EM geological mapping, a magnetic receiver is used to measure the earth response to a primary magnetic field ("primary field") transmitted by the survey system. The relation between the transmitted primary field and the earth response is used to calculate the electrical resistivity structure of the earth, from which geological information is inferred.

Active EM surveying includes both frequency domain EM (FDEM) and time domain EM (TDEM) techniques. In FDEM, the earth response is measured as a function of frequency. In TDEM, the earth response is measured as a function of time after a transmitted pulse. In all FDEM and TDEM techniques, the magnetic receiver senses the superimposed primary field and earth response.

EM surveying is implemented using ground, water, and airborne equipment. Airborne systems exist for both fixed wing and helicopter aircraft. In the case of helicopter borne EM systems, the receiver and transmitter may be attached to a structure ("bird") which is towed by the helicopter. In some systems the receiver is located close to the receiver and the primary field magnitude is large relative to the earth response.

In a practical active EM survey system, a time varying electric current ("transmitter current") is passed through a wire coil or loop ("transmitter loop"), thereby generating a time varying magnetic field ("primary field"). The magnetic field induces electric currents in the earth, which generate a secondary magnetic field, the earth response. The earth response is sensed by one or more receivers and is recorded by a data acquisition system. The receiver may itself be a wire coil or loop ("receiver coil"), although other types of receivers have been used.

In active source EM systems, the magnitude of the earth response can be orders of magnitude less than the effect of the primary magnetic field on the receiver. In passive source EM systems, the earth response that must be measured can be of very low magnitude. Accordingly, in both systems noise mitigation is a primary concern and accurate measurement of the earth response typically involves a combination of physical equipment and electronic signal processing to both reduce the impact of noise on the receiver itself and also to remove noise from any signals measured by the receiver. Examples of systems that strive to provide accurate earth response measurements are described, for example, in U.S. Pat. Nos. 8,674,701 and 6,876,202, which are directed to an active system and a passive system respectively.

Despite the extensive advancements that have been made in the field of airborne surveying, achieving further advancements in noise mitigation is desirable.

SUMMARY

According to example embodiments is a tow assembly for airborne geophysical surveying that comprises a frame incorporating geophysical surveying equipment; and a suspension assembly for suspending the frame from an aircraft. The suspension assembly has a plurality of suspension ropes connected to the frame at spaced apart connection points for suspending the frame from an aircraft. Lengths of the suspension ropes are adjustable with respect to at least four of the connection points to adjust an attitude of the frame during flight.

According to another example embodiment is a tow assembly for airborne geophysical surveying that includes a frame incorporating geophysical surveying equipment; and a suspension assembly for suspending the frame from an aircraft. The suspension assembly has a first suspension rope connected to a first pair of connection points on the frame and a second suspension rope connected to a second pair of connection points on the frame, the first suspension rope extending over a first low friction coupler, the second suspension rope extending over a second low friction coupler. The first low friction coupler and the second low friction coupler are each connected to a tow line system for attachment to the aircraft, wherein the first pair of connection points and second pair of connection points are positioned on the frame so that the suspension ropes move on the couplers to automatically maintain a target pitch of the frame throughout a varying range of aerodynamic forces.

According to another example embodiment is a tow assembly for airborne geophysical surveying that includes a frame incorporating geophysical surveying equipment, and a suspension assembly for suspending the frame from an aircraft, the suspension assembly having a plurality of suspension ropes connected to the frame at spaced apart connection points for suspending the frame from an aircraft. Lengths of the suspension ropes are adjustable with respect to at least four of the connection points to adjust an attitude of the frame during flight.

According to another example embodiment is a method of leveling a geophysical surveying platform that is suspended from an aircraft. The method includes supporting the geophysical surveying platform with a plurality of suspension ropes; and dynamically adjusting supporting lengths of the suspension ropes to maintain a target attitude of the geophysical surveying platform while the platform is towed from the aircraft.

According to an example embodiment there is provided an attitude adjustment system for airborne geophysical surveying, comprising: a frame incorporating geophysical surveying equipment and including a plurality of suspension ropes connected to the frame at spaced apart locations for suspending the frame during airborne surveying; a sensor for sensing an attitude of the frame; a suspension system attached to at least some of the suspension ropes and configured to adjust an extended length thereof; and a control system responsive to the sensor and communicating with the system to cause the system to selectively adjust the extended suspension rope lengths to maintain a desired attitude of the frame.

BRIEF DESCRIPTION OF THE DRAWINGS

FIG. 4 is a schematic view of a winch with multiple drum diameters which may be used in example embodiments;

FIG. 5 is a schematic view of an alternative form of rope length adjustment mechanism that may be used in example embodiments;

FIG. 6 is an elevational view of part of the tow assembly of the system of FIG. 1 according to example embodiments;

FIG. 7 is a perspective view of an alternative tow assembly according to example embodiments;

FIG. 13 illustrates a schematic perspective view of a further tow assembly according to example embodiments; and FIG. 14 illustrates a schematic view of an automated line take up system used in the tow assembly of FIG. 13.

DESCRIPTION OF EXAMPLE EMBODIMENTS

Existing airborne geophysical surveying systems often employ a bird or tow assembly that is suspended from an aircraft such as a helicopter to support geophysical surveying equipment. Typically, existing towing platforms have a fixed length rigging geometry which results in the towed platform remaining level only over a narrow range of helicopter flight velocities, climb rates and wind conditions. In some systems, the suspension rigging is configured such that when the towing helicopter is hovering the tow lines hang vertically causing the surveying equipment, for example the transmitter loop in an active system, to be tilted. As the helicopter moves forward, the aerodynamic drag on the platform pulls the loop behind the helicopter while at the same time, the tension on the tow lines decreases the pitch, thus, leveling out the transmitter loop. The tilt of the loop depends on the aerodynamic loading on the platform with the main element being the drag and caused by wind resistance at velocity. At a higher velocity, the loop starts to increase its pitch bringing the leading edge up beyond level. In order for the loop to be level, each line has to be at a specific length, which cannot be achieved in a fixed suspension rigging system.

The challenge is to be able to take off and then to fly at different velocities while the towed platform remains level. In example embodiments described herein, this result is achieved by dynamically altering the length of individual suspension lines that support the surveying equipment.

Figure 1:
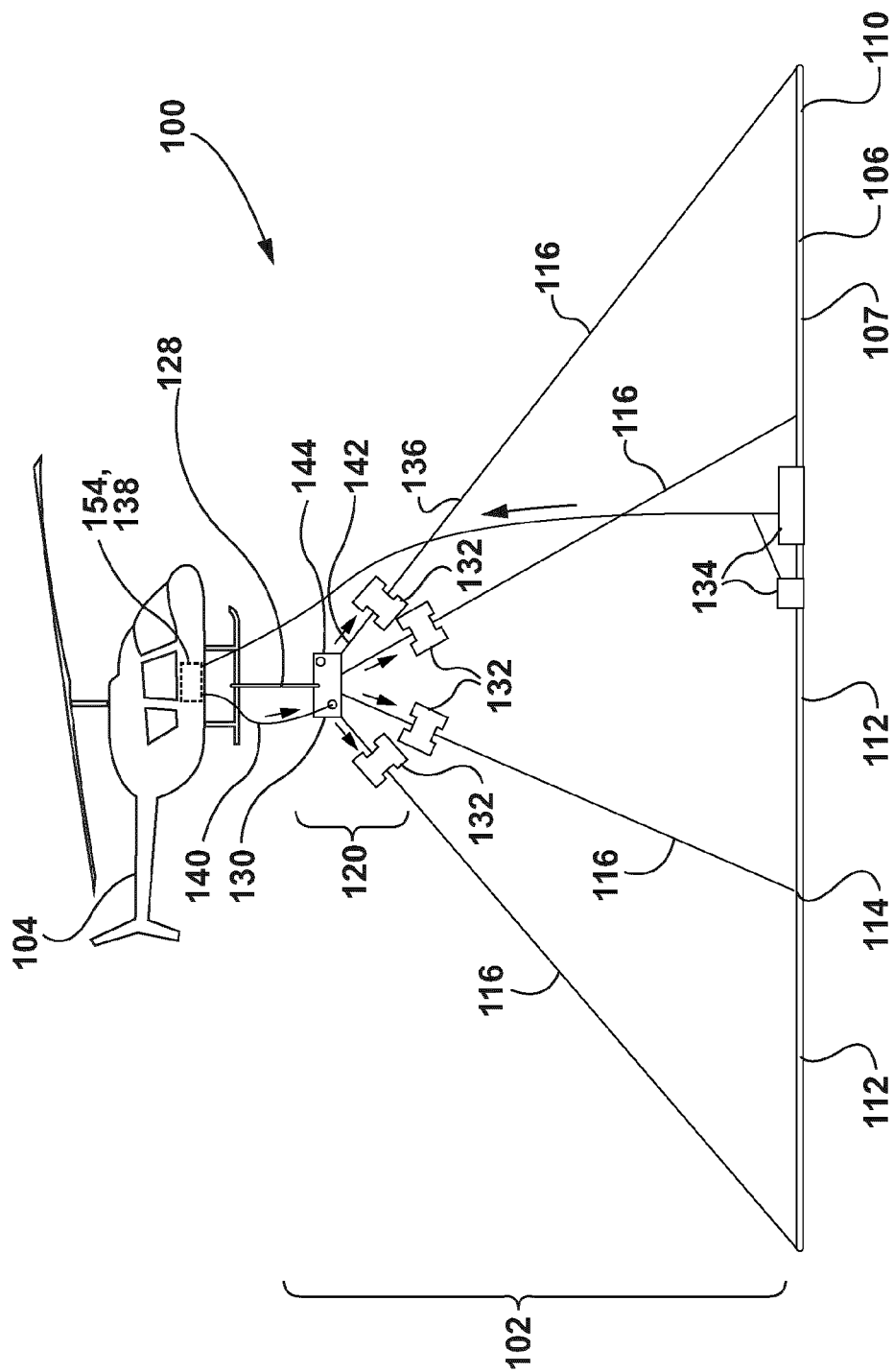
FIG. 1 is an elevational view of an example of an airborne time domain electromagnetic system to which example embodiments of the systems described herein can be applied.

Example embodiments are described herein that can be applied to tow assemblies that are suspended from aircraft for geophysical EM surveying. In some applications, it may be possible to apply one or more of features described herein to passive EM surveying systems and in some applications, it may be possible to apply one or more of features described herein to active EM surveying systems. Example embodiments with first be described in the context of an active EM surveying system, and in this regard, FIG. 1 illustrates an example of a helicopter-borne active EM surveying system 100 and FIGS. 2 and 3 respectively illustrate top and bottom plan views of a tow assembly of that system 100.

Figure 2:
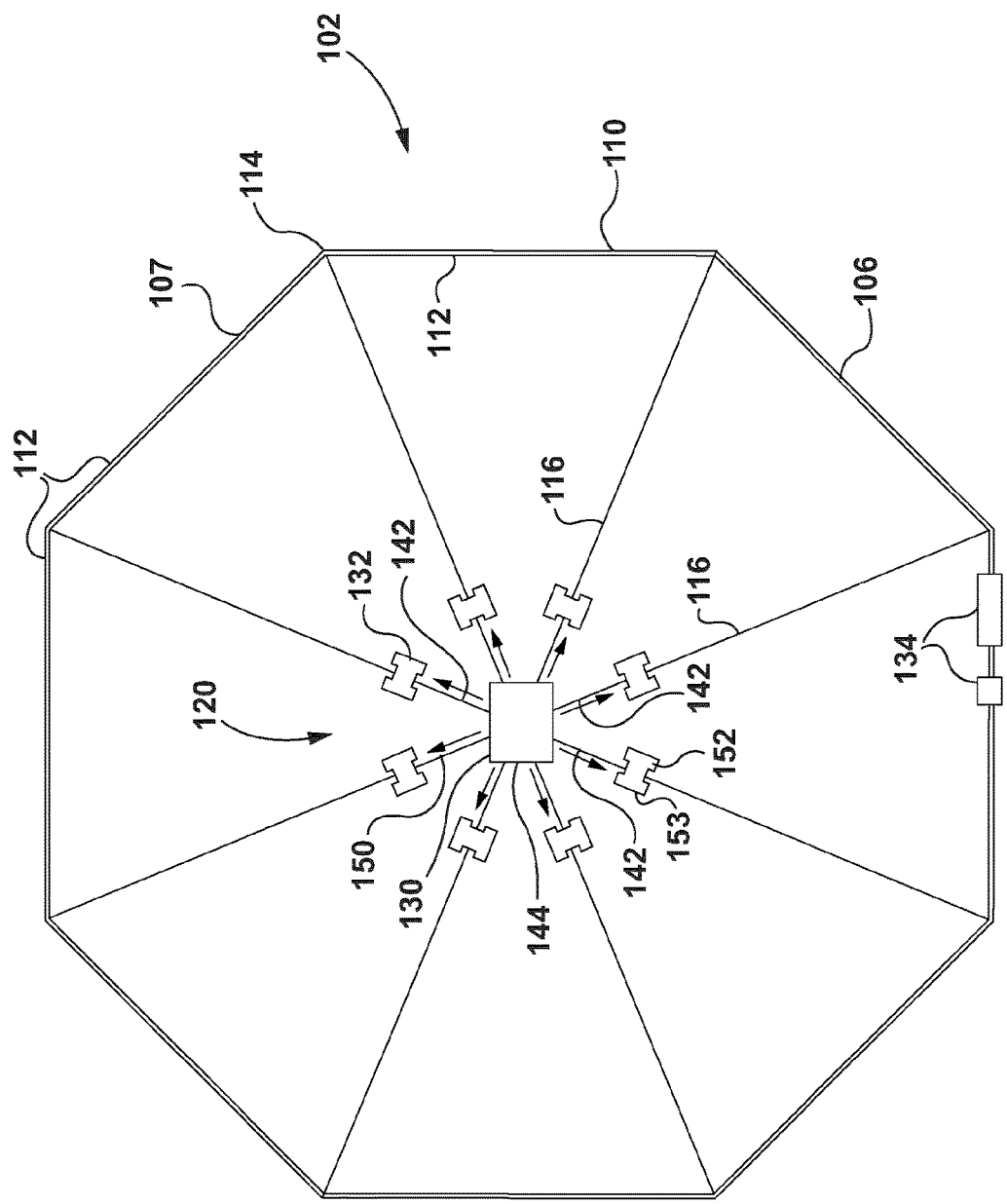
FIG. 2 is a top plan view of a tow assembly of FIG. 1.
Figure 3:
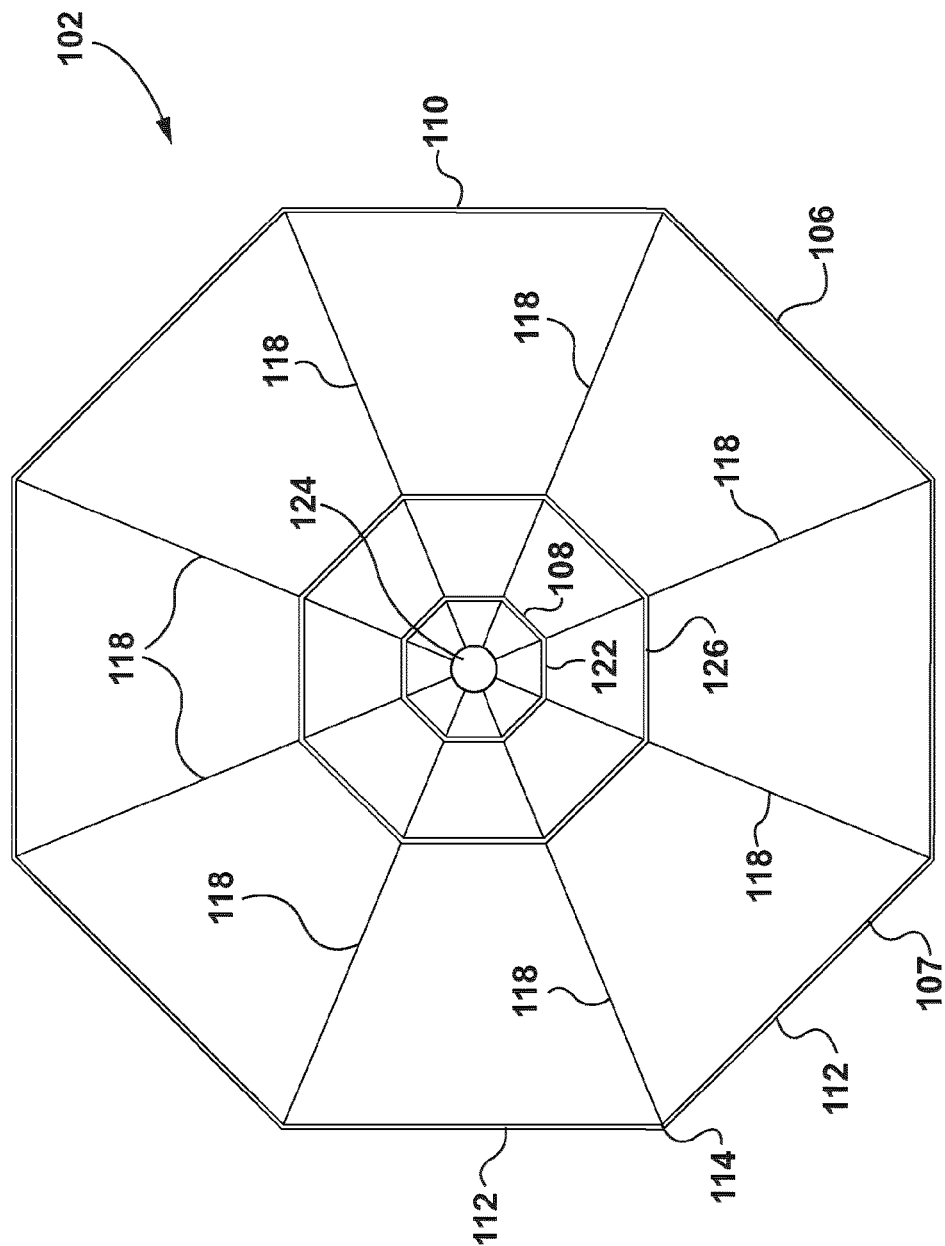
FIG. 3 is a bottom plan view of the tow assembly of FIG. 1.

The TDEM survey system 100 includes a tow assembly 102 suspended from helicopter 104. The tow assembly 102 supports geophysical surveying equipment such as, for example, a transmitter assembly 106 and a sensor assembly 108. The transmitter assembly 106 includes a transmitter loop 110, which may for example take the form of a wire or other conductor having one or more turns. In the embodiment of FIGS. 1 to 3, the transmitter assembly 106 includes a polygonal frame 107 of multiple rigid tubular straight sections 112 joined at vertices or corners 114. In one example embodiment, transmitter loop 110 is supported internally within the tubular sections 112. In another example embodiment, the transmitter loop 110 is secured externally to the frame 107. The vertices 114 of the transmitter assembly 102 are supported and held in position relative to each other by suspension ropes 116 and radial ropes 118. Suspension ropes 116, which may for example be formed from a Kevlar™ reinforced rope, extend upward from the transmitter assembly 106 to a suspension platform 120.

Referring to FIG. 3, in an example embodiment the sensor assembly 108, which houses a sensor 122 such as a receiver coil for measuring the earth response to primary signals generated by the transmitter loop 110, is held in position by radial ropes 118 that extend from a central hub location 124 to the corners or vertices 114 of transmitter frame 107. In some example embodiments the sensor assembly 108 and sensor 122 are co-planar and co-centric with the transmitter loop 110, although the receiver sensor could be alternatively be located in other positions relative to transmitter loop 110, such as above or below the transmitter loop 110. Electrical wires that drive the transmitter loop 110 and sensor wires that measure signals from the receiver sensor 122 run up the tow assembly structure and are respectively connected to a transmitter driver and a data recording system 154 located in the helicopter 104.

In some example embodiments, a bucking coil 126 may also be incorporated into the tow assembly 102 to mitigate against the effects of the primary field on the earth response receiver sensor 122.

Referring to FIGS. 1 and 2, as noted above, suspension ropes 116 are secured to a suspension system that includes suspension platform 120. The suspension platform 120 is itself suspended by a flexible tow rope or tow line 128, which may for example be a Kevlar™ reinforced rope, from helicopter 104. In example embodiments, the suspension platform 120 is part of an attitude adjustment system configured to maintain the transmitter assembly 106 (and transmitter loop 110) in a substantially horizontal plane as shown in FIG. 1 during take-off, flight, and landing. In the illustrated example embodiment the attitude adjustment system includes, in addition to suspension platform 120: pitch and roll sensors 134 that are secured to the transmitter assembly 106 to determine on an ongoing basis the attitude of transmitter assembly 106; an attitude controller 138 located in helicopter 104; and a communications link 136 (which may for example be a wire line, but could alternatively be a wireless link) connecting the pitch and roll sensors 134 to the attitude controller 138. The attitude controller 138 may for example include a digital computer, and in some embodiments may use the same computer system that is used to implement data recording system 154 for collecting data from receiver 122.

The suspension platform 120 includes a suspension rope length adjustment system, which in the illustrated embodiment takes the form of a winch system that includes multiple electrically powered bi-directional winches 132, which are each suspended by a respective rope 142 (which may for example be a Kevlar™ reinforced rope) from a winch support platform 130, which in turn is suspended from the helicopter 104 by the tow rope 128. A winch controller 144 is supported on winch support platform 130, and is electrically connected to attitude controller 138 by communications/power line 140 and to each of the winches 132 by respective control/power lines 150. In example embodiments, winch controller 144 may be implemented using a PLC or other computing device. In some example embodiments, winch controller 144 and attitude controller 138 may be implemented on the same computing device.

Each of the tow assembly suspension ropes 116 is connected to a drum 152 of a respective winch 132 such that each suspension rope 116 can be selectively retracted and extended to adjust its length relative to the suspension platform 120. During operation, pitch and roll sensors 134 continuously provide attitude data about the transmitter assembly 106 and transmitter loop 110 to attitude controller 138. Attitude controller 138 continually processes the attitude data to determine what length adjustments are required for each of the suspension ropes 116 in order to maintain the transmitter assembly and loop 110 in a horizontal orientation with a vertical dipole. The calculated length adjustments are translated into instructions that are provided to winch controller 144, which then selectively causes the appropriate winches 132 to either take up or release their respective suspension ropes 116 in order to achieve horizontal orientation of the transmitter assembly 106.

In some example embodiments, each winch 132 is configured, upon receiving a retraction instruction from winch controller 144, to use an electrically powered motor 153 to rotate its drum 152 to shorten the extended length of the suspension rope 116 by rolling a calculated length of the upper end section of the rope 116 onto the drum 152. Each winch 132 may be configured, upon receiving an extension instruction from winch controller 144, to release its drum 152 to allow a calculated length of the rope 116 to unroll from drum 152 and extend under force of gravity.

As noted above, in TDEM systems the transmitter loop 122 operates as a series of "On" pulses followed by "Off" periods. In some example embodiment, the motors 153 that drive winches 132 are synchronized to only operate within the time range that the transmitter loop 122 is generating "On" pulses and to be inactive when the transmitter loop is in "Off" periods. In such a configuration, for example if the transmitter loop 122 is operating at 30 Hz, the motors 152 are each pulse driven (when a rope length adjustment is required) by winch controller 144 to operate at the same 30 Hz frequency such that each motor 152 is in-active during the "Off" periods (when sensor 122 is most susceptible to interfering noise) and active during the "On" periods. Such a feature may in at least some embodiments reduce electrical interferences caused during the transmitter "Off" time by motors 153 of winches 132. In some example embodiments, winch drive motors 153 may be stepper motors coordinated so that they will only actively drive their respective drums during transmitter "On" times.

Accordingly, in example embodiments the attitude adjustment system that is incorporated into geophysical surveying system 100 functions such that the extended lengths of suspension ropes 116 are individually automatically adjusted in real-time based on feedback from pitch and roll sensors 134 in order to maintained a desired orientation of the transmitter assembly 110 and the transmitter loop 106. In the system shown in FIGS. 1-3, the attitude adjustment system includes eight winches 132 each adjusting the length of a respective suspension rope 116, however the number of suspension ropes and winches can be more or less than eight in different embodiments.

By way of non-limiting example, in some embodiments, the transmitter loop 110 has a diameter of over 20 meters. In some embodiments, transmitter loop 110 has a diameter of between 20-60 meters. In some embodiments, the transmitter loop 110 may have a diameter of less than 20 meters. By way of non-limiting example, in some embodiments, each winch may be configured to extend or retract between 2 to 5 meters of rope under instructions from winch controller 144.

In some example embodiments the attitude adjustment system operates to simultaneously shorten suspension ropes 116 that are located at the front of the tow assembly 102 while shortening ropes that are located at the back of the tow assembly 102, or vice versa, in order to accelerate the rate at which the pitch of the transmitter loop 110 is adjusted. Similarly, In some example embodiments the attitude adjustment system operates to simultaneously shorten suspension ropes 116 that are located on the port side of the tow assembly 102 while shortening ropes that are located at the starboard side of the tow assembly 102, or vice versa, in order to accelerate the rate at which the roll of the transmitter loop 110 is adjusted.

Large transmitter loop systems that are currently used for geophysical surveying tend to employ suspension systems that use suspension ropes of fixed lengths. Such systems often have longer ropes on the back of the system and shorter ropes at the front in order to maintain a desired orientation at a set survey flight speed. Such systems require frame designs that can withstand uneven forces about the loop perimeter during system take off and landing. Furthermore, once in flight, such systems limit the range of speed that the towing helicopter can fly at and maintain the desired orientation of the transmitter loop.

However, in some example embodiments, the attitude adjustment system described herein may help reduce structural stresses on the transmitter assembly 106 during take-off and landing as the transmitter assembly 106 can be orientated horizontally during vertical take off and landing so that it will uniformly contact the ground about its perimeter, thereby reducing any asymmetrical stresses that may otherwise be applied on the assembly 106.

Furthermore, in some example embodiments, the attitude adjustment system operates to dynamically adjust the lengths of the suspension ropes 116 to maintain the transmitter assembly 106 and transmitter loop 110, as well as the receiver assembly 108, in a substantially consistent horizontal orientation under different flight speeds and wind conditions, thereby enabling a survey to be flown at a wider range of speeds than might be possible with a tow assembly that uses fixed suspension rope lengths. In particular, when flying a survey over varied terrain it may be desirable to fly at lower survey speeds over mountainous or hilly terrain and at higher speeds over flat terrain; the attitude adjustment system described herein can allow for in-flight adjustment of the transmitter assembly 106 orientation to compensate for the different air pressure effects that occur at different speeds, different altitudes, and varying wind conditions during a survey. Mitigating against the physical effects of varying transmitter assembly 106/receiver 122 orientations may in some embodiments also reduce noise introduced into system measurements, especially when attempting to sample receiver signals immediately after a transmitted pulse in a time domain system.

In some applications, the ability to reduce landing and take-off stress may also allow lighter weight materials and/or more rigid materials to be used in the construction of the transmitter support frame 107 and other components of the tow assembly 102. Lighter weight materials, for example, can facilitate the use of larger loop transmitters in some applications which may improve system accuracy. More rigid materials, for example, may reduce relative movement between the transmitter loop 110 and receiver sensor 122, which may reduce noise in some survey applications.

The tow assembly and suspension configurations described above can be varied in many respects and still achieve similar results. For example, in some embodiments, attitude tracking and adjustment may be limited to maintaining a consistent pitch within a target pitch range without concern for roll. In some systems the number of adjustable length suspension ropes 116 may be less than the total number of suspension ropes 116—for example, in tow assembly 102, in some embodiments winches 132 may be provided for only the four trailing suspension ropes 116, in which case attitude adjustment is provided retracting and extending the trailing four ropes 116 while the lengths of the leading four ropes 116 are always at a constant length. (As used herein, trailing and leading are used with reference to flight direction).

Although separate winches are shown for each suspension rope 116, in some example embodiments multiple suspension ropes 116 are connected to a common wench. In such systems, the winch may have different diameter drum sections for different suspension ropes 116 to compensate for different connection point configurations. In this regard FIG. 4 illustrates an example of a winch 132' that is driven by motor 153 and has a drum 152 with two different drum diameter sections 152A, 152B which could be used to replace two separate winches 132 in system 100. The suspension rope 116 connected to smaller diameter drum section 152A may have a shorter winch to tow assembly length than the suspension rope 116 connected to larger diameter winch drum section 152B. In some example embodiments, having multiple suspension ropes per winch, one or more ropes may be reverse coiled on the winch relative to other ropes such that rotation of the winch drum simultaneously extends some ropes and retracts others.

Although shown as an octagonal simple polygon in FIGS. 1-3, the transmitter assembly 106 could take a number of other loop-type forms, including square, rectangular, circular, or oval to name a few.

Although the winches 132 are shown in FIGS. 1 and 2 as being located close to the winch support platform 130, in other example embodiments the winches 132 can be located at other locations between the winch support platform 130 and the transmitter assembly 106 such that the suspension ropes 116 are shorter and winch support ropes 142 are longer relative to what is illustrated in FIGS. 1 and 2. Furthermore, in example embodiments each suspension rope 116 could be fixed in a stationary location relative to its winch 132 with winch support rope 142 being the rope that is attached to drum 152 for extension and retraction. In some example embodiments, winches 132 may be directly secured to the corners 114 of transmitter assembly frame 107 and suspension ropes 116 may extend upwards from the winches 132 to a connection point at tow ring 118.

In some example embodiments, the mechanism used to adjust the suspension length of a suspension rope 116 could take the form of something other than a winch 132. By way of example, FIG. 5 illustrates a suspension rope length adjustment mechanism that includes a pulley 502 suspended from support platform 130 by support rope 142. Suspension rope 116 passes between pulley 502 and a motor powered wheel 504. Rotation of motor powered wheel 504 controls the distance that portion 116A of suspension rope 116 that extends from the pulley 502 to the transmitter support frame 107. In some example embodiments, the other end 116B of suspension rope 116 hangs lose, however in some example embodiments, the other end 116B may be connected to an opposite end of the transmitter support frame 107 than end 116A such that rotation of wheel 504 causes one end of the frame 107 to lift while other end drops.

As noted above, in some example embodiments transmitter loop 110 may comprise multiple turns of a wire internally located within tubular frame sections 112, and in some embodiments, transmitter loop may comprise multiple turns of a wire secured externally to the frame sections 112. In this regard, FIG. 6 illustrates a section of transmitter assembly 106 in which the transmitter loop 110 is secured externally to a top surface of frame sections 112 of transmitter frame 107. In the embodiment of FIG. 6, Velcro™ or other types or releasable straps 602 are secured at intervals along frame sections 112 to allow the transmitter loop 110 to be releasably secured to the transmitter frame 107.

Many different configurations of EM survey tow assembly configurations can be supported by the attitude adjustment systems described herein. In this regard, FIG. 7 shows an example of an alternative embodiment of a TDEM tow assembly 702 that is suspended from suspension platform 120. Similar to tow assembly 102, the tow assembly 702 includes a transmitter assembly 706 that is supported at corners 714 by suspension ropes 116 and incorporates a transmitter loop 710 and supports a central earth response receiver 122. However, in the embodiment of FIG. 7, the transmitter loop 710 is formed from multiple turns of aluminum tubing (for example four turns) which provides a dual function as providing a rigid structure for the assembly 706 while also providing the conductor required to generate the primary field. Reinforced corners 714, which may for example be formed from Kevlar™ reinforced rigid materials, provide structural elements for connecting the tube elements of the loop 710 together. During take off, flight and landing, automatically adjusting suspension platform 120 adjusts the extended lengths of suspension ropes 116 top maintain the transmitter loop 710 in a vertical dipole, horizontal loop orientation in the same manner as described in the above embodiments in respect of assembly 102.

Figure 8:
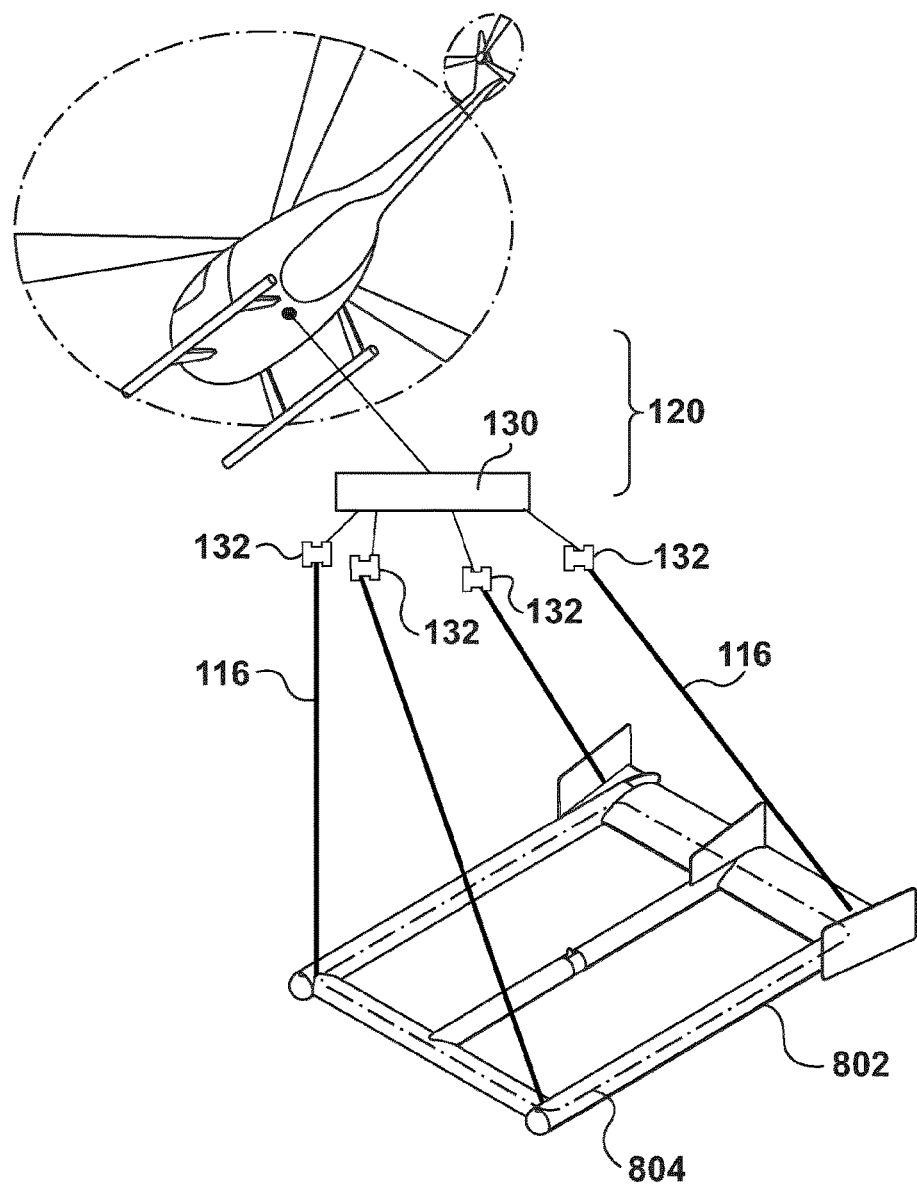
FIG. 8 is a perspective view of another alternative tow assembly according to example embodiments.

Although described above in the context of an active EM system, embodiments of the attitude adjusting system described herein can also be applied to a number of different airborne EM survey systems in which a rope suspended frame is used to support surveying equipment or instrumentation at a desired attitude. By way of example, the attitude adjusting system can also be applied to passive EM monitoring systems and in this regard FIG. 8 illustrates a system applied to receiver tow assembly 802 that is used in an AFMAG system that measures the earth response to naturally occurring EM sources. Although many different configurations are possible, in the illustrated embodiment, receiver tow assembly 802 has a rigid rectangular frame that supports a receiver coil 804. The tow assembly frame is supported at its corners by suspension ropes 116 that are connected to automatically adjusting suspension platform 120. Platform 120 adjusts the extended lengths of suspension ropes 116 to maintain the AFMAG receiver coil 804 in a vertical dipole, horizontal loop orientation in the same manner as described in the above embodiments in respect of TDEM assembly 102.

Figure 11A:
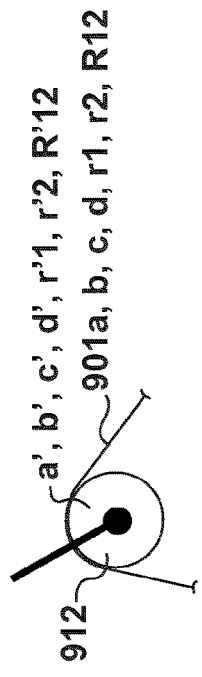
FIG. 11A illustrates a pulley coupling point of the tow assembly of FIG. 11.
Figure 11:
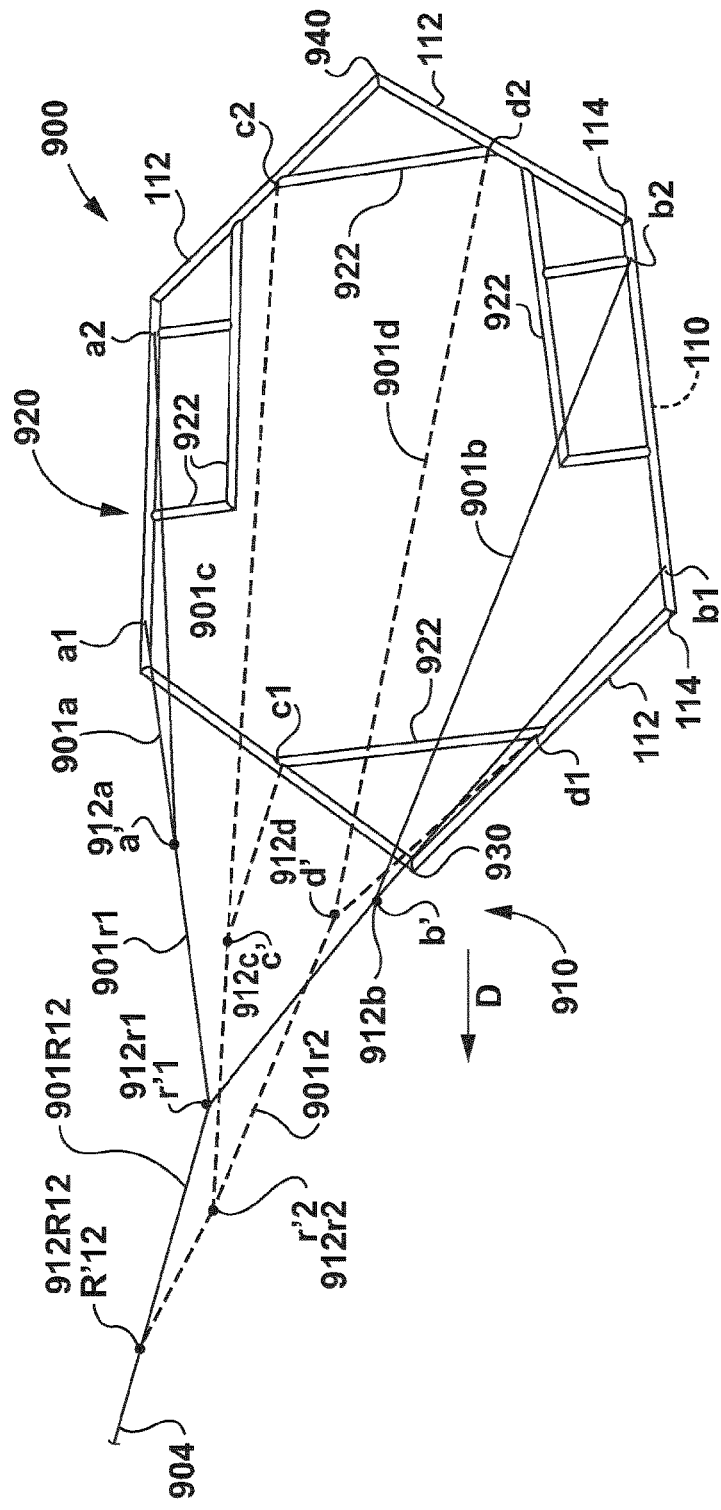
FIG. 11 illustrates a schematic perspective view of a tow assembly that incorporates the building block of FIG. 9.
Figure 12:
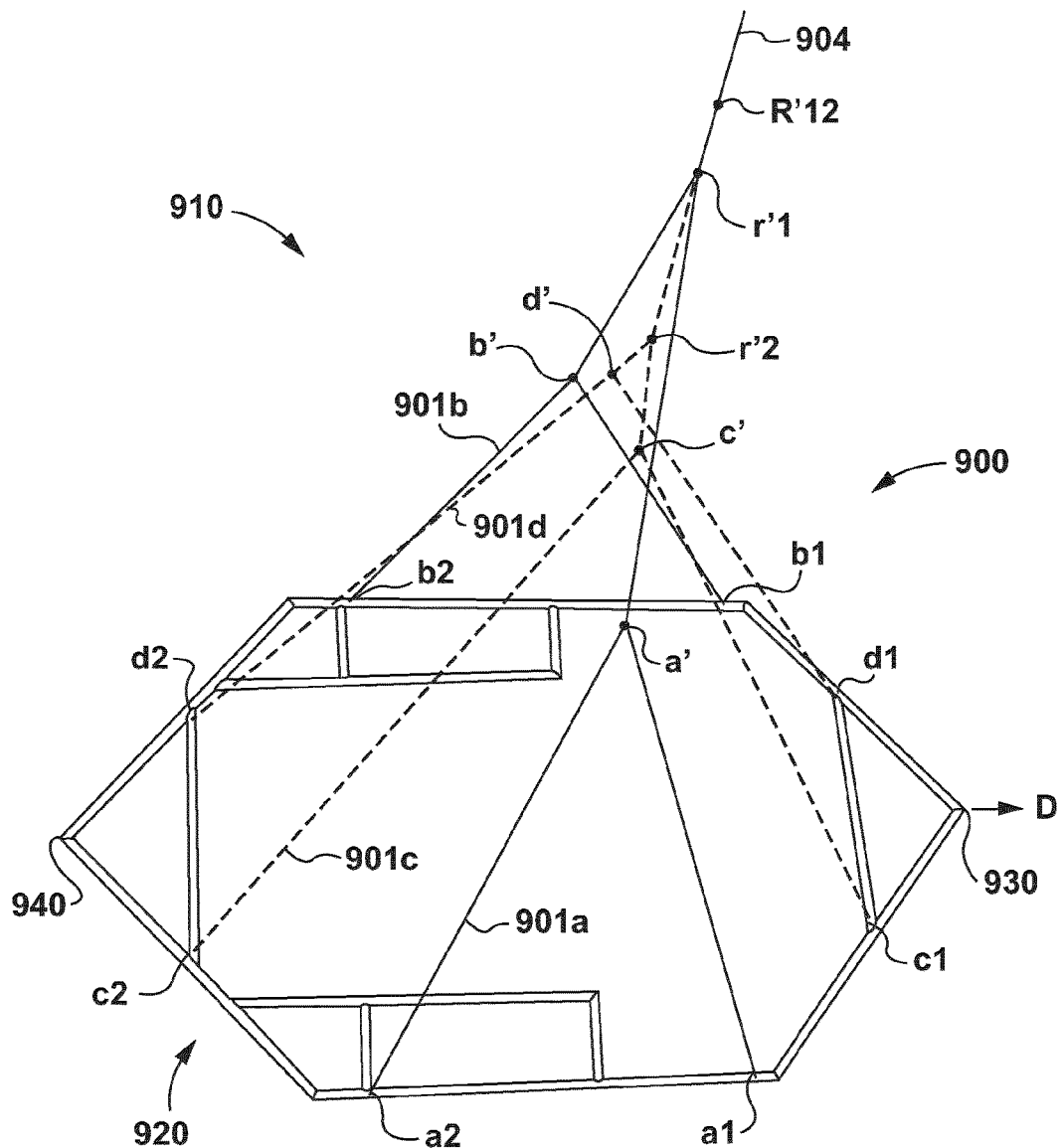
FIG. 12 illustrates a further schematic perspective view of the tow assembly of FIG. 11.

In a further example embodiment, the tow assembly is configured to function as a dynamic, self-leveling platform by using aerodynamic forces and gravity to adjust the length of the suspension ropes that suspend the frame. In this regard, FIG. 9 represents a building block of a tow assembly system 900 that is schematically shown in FIGS. 11 and 12.

Figure 9:
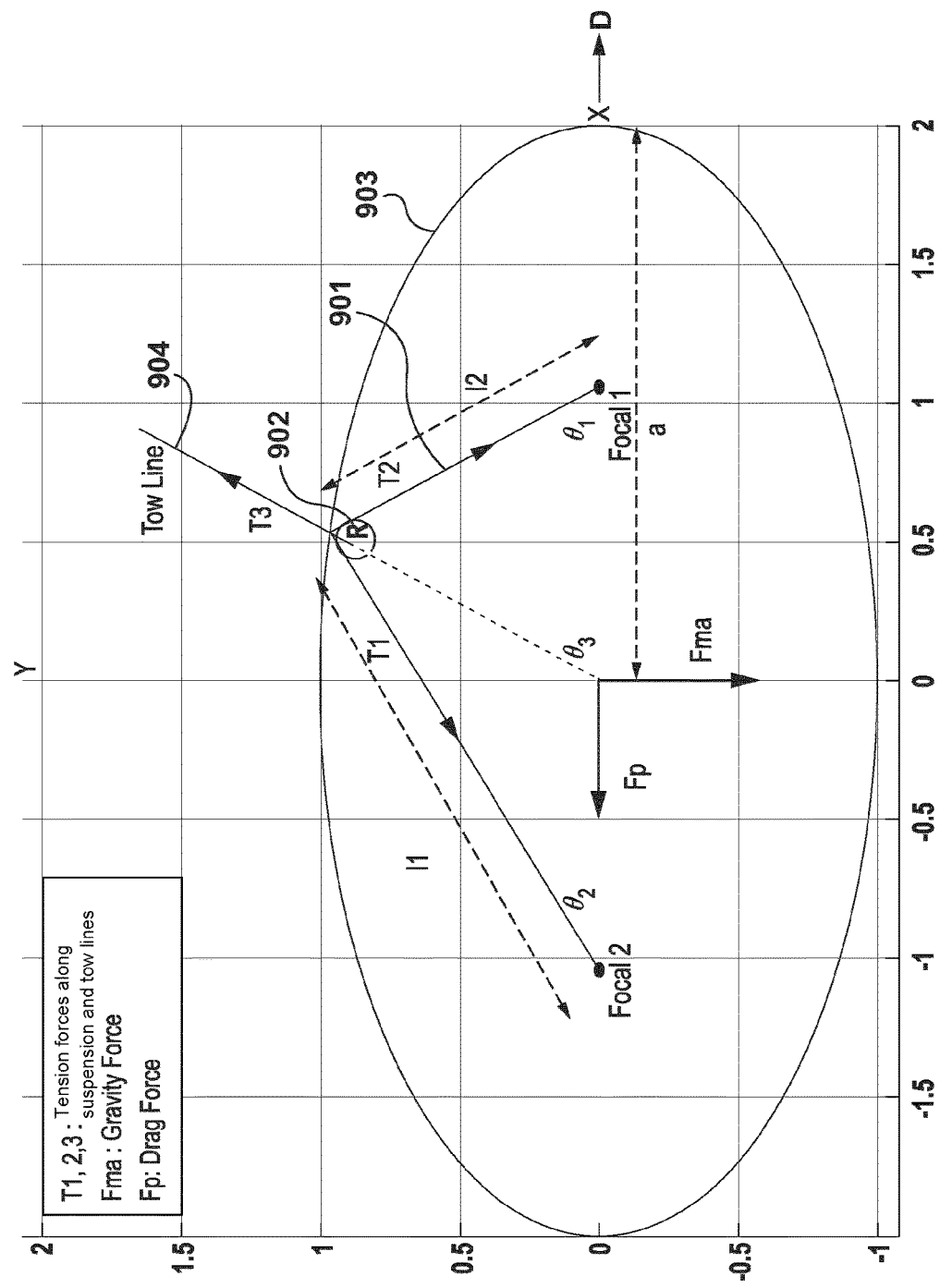
FIG. 9 is a schematic view of a building block applied to a further example embodiment of a tow assembly.

In the building block of FIG. 9, the arrow "D" represents an intended direction of travel. A suspension rope 901 extends between two points of a tow assembly frame 903 (which may for example be a transmitter loop support frame) and is supported between its ends at a coupling point 902, which in example embodiments is a pulley roller or other low fiction point that the suspension rope 901 can move along. In particular, each end of a suspension rope 901 of length l1+l2 is attached to the transmitter loop frame 903 at points Focal 1 and 2; the suspension rope 901 is put over coupling point R which is a roller 902 or a low friction surface; coupling point R is attached to a tow line 904 which in turn is attached to the hook of a helicopter or other aircraft.

It will be understood that each line (in FIG. 9, suspension rope 901) in the rigging of the tow assembly can only take load in a straight line in the direction of the tension. In the example of FIG. 9, if T3 is the tension on the tow line 904 then when the tow assembly system is in equilibrium, we have the following equations:

$$\text{projection of } \overline{T1} + \overline{T2} \text{ on } \overline{T3} \text{ equals } T3 \quad (1)$$

$$T3 \text{(tension on tow line 904)} = \sqrt{(Fp^2 + Fma^2)} \quad (2)$$

$$Fma \text{(for the transmitter loop)} = \text{mass} \times \text{gravity} \quad (3)$$

$$T1x = T2x \quad (4)$$

$$T1y = T2y \quad (5)$$

$$Fp = T1x + T2x \quad (6)$$

$$Fma = T1y + T2y, \quad (7)$$

where T1 and T2 are tension of the rope lengths l1 and l2 around the pulley R, Fma and Fp are the gravity and the aerodynamic drag forces, respectively. Fp is primarily in the opposite direction to the motion D ignoring the small component of lift or downward aerodynamic forces. Notations T1x and T1y are the projections of the T1 force along the x- and y-axis, similarly for T2x and T2y.

Figure 10:
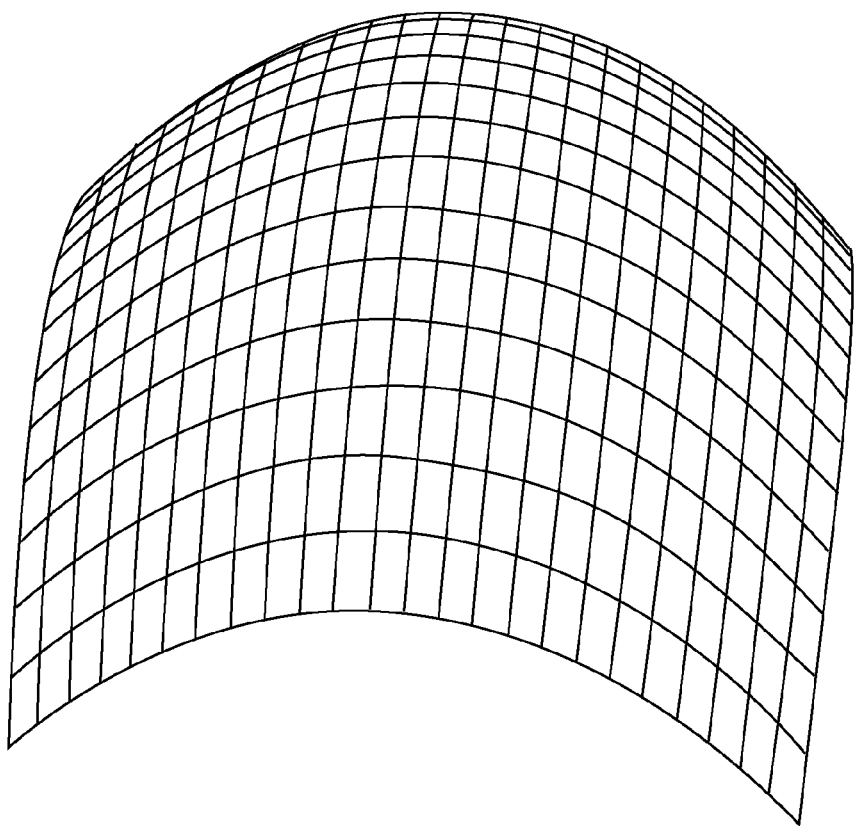
FIG. 10 illustrates a elliptic paraboloid model.

In the example of FIG. 9, the points Focal 1 and Focal 2 are focal points of an ellipse, such that point R follows the equation of an ellipse. In example embodiments, the tow assembly frame is modeled as an elliptic paraboloid such as that illustrated in FIG. 10, and suspension ropes are attached to respective pairs of focal points on the modeled elliptic paraboloid. In this regard, FIGS. 11 and 12 illustrate an example of a tow assembly 900 to which the building block concepts of FIG. 9 have been applied. In FIGS. 11 and 12, arrow D represents a direction of flight (to the left in FIG. 11 and to the right in FIG. 12). The tow assembly 900 includes a suspension assembly 910 that suspends a frame 920 that incorporates geophysical surveying equipment. In an example embodiment, the tow assembly 900 is part of an active EM surveying system and the geophysical surveying equipment that is incorporated by the frame 920 includes a transmitter loop 110 having characteristics similar to the loops described in respect of the embodiments of FIGS. 1-7 above. The frame 920 may also support a receiver sensor similar to receiver sensors 122 in the above described embodiments, although the receiver sensor and its support structure are omitted from FIGS. 11 and 12 for clarity.

In the example of FIGS. 11 and 12 the frame 920 is a polygonal frame including a plurality of rigid tubular straight sections 112 joined at vertices or corners 114 to form a loop structure, and the transmitter loop 110 is supported internally or externally by the tubular sections 112. The frame 920 may also include addition structural elements 922 to provide increased rigidity and strength to the frame 920. Frame 920 can take a number of other configurations, including for example the different transmitter loop frame configurations described above in respect of FIGS. 1-7.

In the illustrated tow assembly, a set of focal point connection pairs {(a1, a2); (b1, b2); (c1, c2); (d1, d2)} are provided on the frame 920. Each focal point pair corresponds to a set of focal points on an elliptic paraboloid. In particular, the frame 920 has a leading end 930 and a trailing end 940 relative to the flight direction D of the frame 920. The first connection point pair a1, a2 includes a leading connection point a1 that is located closer to the leading end 930 of the frame 920 than the trailing end 940, and a trailing connection point a2 that is located closer to the trailing end 940 of the frame than the leading end 930. Similarly, the second connection point pair b1, b2 includes a leading connection point b1 that is located closer to the leading end 930 of the frame 920 than the trailing end 940, and a trailing connection point b2 that is located closer to the trailing end 940 of the frame. The connection point pairs (a1, a2) and (b1, b2) are arranged with each point being located at the corner of a rectangle such that the pair a1, a2 fall on a line parallel to connection point pair b1, b2, the leading points a1 and b1 are located the same distance from the leading end 930 of the frame 920, and the trailing points a2 and b2 are located the same distance from the trailing end 940.

The third connection point pair c1, c2 includes a leading connection point c1 that is located closer to the leading end 930 of the frame 920 than the trailing end 940, and a trailing connection point c2 that is located closer to the trailing end 940. Similarly, the fourth connection point pair d1, d2 includes a leading connection point d1 that is located closer to the leading end 930 of the frame 920 than the trailing end 940, and a trailing connection point d2 that is located closer to the trailing end 940 of the frame than the leading end 930. The connection point pairs (c1, c2) and (d1, d2) are also arranged with each point being located at the corner of a rectangle such that the pair c1, c2 fall on a line parallel to connection point pair d1, d2, the leading points c1 and d1 are located the same distance from the leading end 930 of the frame 920, and the trailing points c2 and d2 are located the same distance from the trailing end 940.

The suspension rope assembly 910 includes a first suspension rope 901a that extends between the connection points a1, a2, a second suspension rope 901b that extends between the connection points b1, b2, a third suspension rope 901c that extends between the connection points c1, c2, and a fourth suspension rope 901d that extends between the connection points d1, d2. The suspension assembly 910 also comprises: a first coupler 912a supporting the first suspension rope 901a at a first coupling point a' that is intermediate the first pair of connection points a1, a2; a second coupler 912b supporting the second suspension rope 901b at a second coupling point b' that is intermediate the second pair of connection points b1, b2; a third coupler 912c supporting the third suspension rope 901c at a third coupling point c' that is intermediate the third pair of connection points c1, c2; a fourth coupler 912d supporting the fourth suspension rope 901d at a fourth coupling point d' that is intermediate the fourth pair of connection points d1, d2.

In the illustrated embodiment, the suspension ropes 901a, 901b, 901c and 901d are all parallel to each other and extend in the direction of travel D. The suspension assembly is symmetrical with respect to a center line of the frame 920 that extends in the direction of travel D from the leading end 930 to the trailing end 940. In an example embodiment, low friction couplers 912a,b,c,d are implemented using rollers or pulley wheels such as shown in FIG. 11A. In operation, movement of the first suspension rope 901a along the first coupling point a' adjusts supporting lengths of the first suspension rope 901a with respect to the first pair of connection points a1, a2, movement of the second suspension rope 901b along the second coupling point b' adjusts supporting lengths of the second suspension rope 901b with respect to the second pair of connection points b1, b2, movement of the third suspension rope 901c along the third coupling point c' adjusts supporting lengths of the third suspension rope 901c with respect to the third pair of connection points c1, c2, and movement of the fourth suspension rope 901d along the fourth coupling point d' adjusts supporting lengths of the fourth suspension rope 901d with respect to the fourth pair of connection points d1, d2.

In example embodiments, the interaction of suspension ropes 901a, 901b, 901c, 901d respectively with couplers 912a, 912b, 912c, 912d provides a pitch control system that enables dynamic, automatic pitch control of the frame 920.

In example embodiments the couplers 912a, 912b, 912c, 912d of the pitch control system are connected through a roll control system to the tow line 904. In the illustrated embodiment, the roll control system includes a first roll control suspension rope 901r1 that is connected at its opposite ends respectively to the first coupler 912a and the second coupler 912b, and a second roll control suspension rope 901r2 that is connected at its opposite ends respectively to the third coupler 912c and the fourth coupler 912d. The first roll control suspension rope 901r1 extends over low friction coupler or a pulley roller coupler 912r1 at a coupling point r'1. The second roll control suspension rope 901r2 extends over low friction coupler or a pulley roller coupler 912r2 at a coupling point r'2. The pulley roller couplers 912r1 and 912r2 in turn are suspended to opposite ends of a third roll control suspension rope 901R12 that passes over a further low friction or pulley roller coupler 912R12 at coupling point R'12. Pulley roller coupler 912R12 is attached to tow line 904.

With respect to the pitch control system, the connection point pairs (a1, a2), (b1, b2), (c1, c2) and (d1, d2) are selected so that the force of aerodynamic drag on the frame 920 during flight will cause movement of the suspension ropes 901a, 901b, 901c and 901d along the respective coupling points (a', b', c', d'), to maintain a target pitch of the frame 920 through a varying range of aerodynamic drag that occurs on frame 920 in response to movement of the frame 920 in direction D. In particular, for balance in the direction D of flight, the connection point pairs (a1, a2), (b1, b2), (c1, c2) and (d1, d2) are focal point pairs that are parallel to each other and the axis of the direction of flight, also the midpoint between each pair is on the centre of the mass axis of the frame 920. As the pairs of pitch control couplers (912a, 912b) and (912c,912d) are joined by through roll control couplers 912r1 and 912r2, respectively, which are in turn attached to the same coupling point R'12 on the tow line 904, the pitch control points a' and b' each follow the other; tracing an elliptical line on opposite sides of an elliptic paraboloid.

In some example embodiments, auto-leveling of the side to side roll is not required and the pivot rollers at coupling points R'12, r'1 and r's can be replaced with fixed attachment points. Although four pairs of connection pair points are shown on frame 920, in some example embodiments, more or fewer bisymmetrically located pairs could be used—for example, only two pairs of connection points (a1, a2) and (b1, b2) and two suspension ropes 901a, 901b may be used to support the frame 920, in some embodiments.

In example embodiments, during flight the suspension ropes of the tow assembly move along their respective low friction couplers such that the lengths of each line or rope section is automatically adjusted to balance out the tension through the suspension assembly 910, resulting in a self leveling tow assembly in which the frame 920 maintains a target orientation throughout changing aerodynamic drag conditions that result from different aircraft velocities and varying weather conditions.

In some example embodiments, where a more tightly controlled leveling is desired, a simple active system could be employed. By way of example, FIG. 13 illustrates a tow assembly 900 that is identical to that shown in FIGS. 11 and 12 except that an active control system has been added to provide assistive pitch control. In particular, the active control system includes a control rope 970 that has one line section 970T connected to the tailing end 940 of the frame 920 and another line section 970L connected to the leading end 930 of the frame 920. The control rope 970 is attached to a powered line take up and release system 980 that is suspended from tow line 904. By way of example, system 980 could include a powered capstan winch 958 that has a drum about which the control rope 970 is looped and which is rotated forwards or backwards by a motor such as an electric brushless servo motor. By pulling up on leading line section 970L, the centre of balance of the frame moves toward the back of the frame platform resulting in suspension ropes 901, a, 901b, 901c and 901d altering their respective leading and trailing lengths to restore the tension balance on each line thus bringing the leading end nose of the frame 920 up. Correspondingly pulling up on trailing line 970T will result on the trailing tail end 940 being brought up. In some embodiments, coupling the motion of lines 970T and 970L through a powered system 980 such as a capstan winch 958 (which operates under a controller 130) allows a single winch to be used to trim either the nose or the tail by the simple act of changing directions. The process can be automated by adding attitude sensors 134 to the frame 920 to provide feedback to controller 130 If active control of roll is desirable then another pair of control lines could be employed to shift the balance of the frame from left to right or right to left.

In some example embodiments the tow assembly 900 may be part of a passive EM surveying system in which case the surveying equipment incorporated into the frame 920 would include a receiver loop. The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within scope of the description so that those skilled in the art should understand that they can make various changes, substitutions and alterations without departing from the scope of the appended claims. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A tow assembly for airborne geophysical surveying, comprising:
    a frame incorporating geophysical surveying equipment; and
    a suspension assembly for suspending the frame from an aircraft, the suspension assembly comprising a plurality of suspension ropes connected to the frame at spaced apart connection points for suspending the frame from an aircraft, lengths of the suspension ropes being adjustable with respect to at least four of the connection points to adjust an attitude of the frame during flight.

2. The tow assembly of claim 1 wherein the frame has a leading end and a trailing end relative to a flight direction of the frame, the at least four connection points comprising a first pair of connection points and a second pair of connection points, the first pair and second pair each including a leading connection point that is located closer to the leading end of the frame than the trailing end, and a trailing connection point that is located closer to the trailing end of the frame than the leading end, the suspension ropes including a first suspension rope that extends between the connection points of the first pair, and a second suspension rope that extends between the connection points of the second pair;
    the suspension assembly comprising:
        a first coupler supporting the first suspension rope at a first coupling point that is intermediate the first pair of connection points,
        a second coupler supporting the second suspension rope at a second coupling point that is intermediate the second pair of connection points; and
        a tow line system connected to the first and second couplers to suspend the couplers from the aircraft,
    wherein movement of the first suspension rope along the first coupling point adjusts supporting lengths of the first suspension rope with respect to the first pair of connection points and movement of the second suspension rope along the second coupling point adjusts supporting lengths of the second suspension rope with respect to the second pair of connection points.

3. The tow assembly of claim 2 wherein the first pair of connection points and the second pair of connection points are selected so that the force of aerodynamic drag on the frame during flight will cause movement of the first and second suspension ropes along the first and second coupling points, respectively, to maintain a target pitch of the frame through a varying range of aerodynamic drag.

4. The tow assembly of claim 3 wherein the first and second suspension ropes extend parallel to each other and a travel direction of the frame, the first pair of connection points being selected to correspond to a first focal point pair of an elliptic paraboloid and the second pair of connection points being selected to correspond to a second focal point pair of the elliptic paraboloid.

5. The tow assembly of claim 3 wherein the tow line system includes a further suspension cable that is supported at a roll control coupling point by a roll control coupler that is connected to a tow line, the further suspension cable having a first end connected to the first coupler and a second end connected to the second coupler, wherein movement of the further suspension rope along roll control coupling point adjusts supporting lengths of the further suspension rope with respect to the first coupler and the second coupler to maintain a target roll of the frame through a varying range of aerodynamic forces.

6. The tow assembly of claim 2 wherein the suspension assembly further comprises a motor driven control line connected to the frame to control a pitch of the frame.

7. The tow assembly of claim 6 wherein the motor driven control line comprises a rope supported by a capstan winch and having first and second ends respectively connected to forward and trailing sections of the frame.

8. The tow assembly of claim 1 comprising and attitude sensor for sensing an attitude of the frame, a controller, and at least one motor controlled by the controller in response to the signals from the attitude sensor to adjust the lengths of the suspension ropes to adjust the attitude of the frame during flight.

9. The tow assembly of claim 8 wherein the surveying equipment includes a transmitter loop supported by the frame for generating a primary EM signal towards a surface of the earth, wherein the transmitter loop is driven with on and off pulses, and wherein the at least one motor is operated exclusively when the transmitter is driven with an on pulse so as to prevent a motor current from interfering with survey measurements made during and off pulse.

10. The tow assembly of claim 1 wherein the surveying equipment includes a transmitter loop supported by the frame for generating a primary EM signal towards a surface of the earth and a receiver sensor for measuring an earth response to the primary EM signal.

11. The tow assembly of claim 1 wherein the surveying equipment includes a receiver sensor supported by the frame.

12. A tow assembly for airborne geophysical surveying, comprising:
    a frame incorporating geophysical surveying equipment; and
    a suspension assembly for suspending the frame from an aircraft, the suspension assembly comprising a first suspension rope connected to a first pair of connection points on the frame and a second suspension rope connected to a second pair of connection points on the frame, the first suspension rope extending over a first low friction coupler, the second suspension rope extending over a second low friction coupler, the first low friction coupler and the second low friction coupler each being connected to a tow line system for attachment to the aircraft, wherein the first pair of connection points and second pair of connection points are positioned on the frame so that the suspension ropes move on the couplers to automatically maintain a target pitch of the frame throughout a varying range of aerodynamic forces.

13. The tow assembly of claim 12 wherein the tow line system includes a connecting rope that supports the first low friction coupler and the second low friction coupler, and a third low friction coupler over which the connecting rope extends, and a tow line connected to the third low friction coupler for attachment to the aircraft, wherein movement of the connecting rope along the third low friction coupler provides roll adjustment for the frame during flight.

14. The tow assembly of claim 12 further comprising a powered line adjustment system for raising and lowering leading and trailing portions of frame to provide pitch control during flight.

15. An attitude adjustment system for airborne geophysical surveying, comprising:
 a frame incorporating geophysical surveying equipment and including a plurality of suspension ropes connected to the frame at spaced apart locations for suspending the frame during airborne surveying;
 a sensor for sensing an attitude of the frame;
 a suspension system attached to at least some of the suspension ropes and configured to adjust an extended length thereof; and
 a control system responsive to the sensor and communicating with the suspension system to cause the suspension system to selectively adjust the extended suspension rope lengths to maintain a desired attitude of the frame.

16. The attitude adjustment system of claim 15 wherein the suspension system comprises winches that are responsive to the control system to selectively adjust the extended suspension rope lengths.

17. A tow assembly for airborne geophysical surveying, comprising:
 a frame incorporating geophysical surveying equipment; and
 a suspension assembly for suspending the frame from an aircraft, the suspension assembly comprising a plurality of suspension ropes connected to the frame at spaced apart connection points for suspending the frame from an aircraft, lengths of the suspension ropes being adjustable with respect to at least four of the connection points to adjust an attitude of the frame during flight.

18. A method of leveling a geophysical surveying platform that is suspended from an aircraft, comprising:
 supporting the geophysical surveying platform with a plurality of suspension ropes; and
 dynamically adjusting supporting lengths of the suspension ropes to maintain a target attitude of the geophysical surveying platform while the platform is towed from the aircraft.

19. The method of claim 18 comprising using sensor to sense an attitude of the platform and using one or more powered devices to automatically adjust the supporting lengths based on the sensed attitude.

20. The method of claim 18 comprising using aerodynamic forces on the platform to automatically adjust the supporting lengths.

* * * * *